United States Patent [19]

Thompson et al.

[11] 4,292,540

[45] Sep. 29, 1981

[54] WIND-POWERED IMPELLER-MIXER

[76] Inventors: Worthington J. Thompson, 109 Powell St., Snow Hill, Md. 21863; Peter A. Freeman, Box 2210, Ocean Pines, Berlin, Md. 21811

[21] Appl. No.: 173,694

[22] Filed: Jul. 30, 1980

[51] Int. Cl.[3] .......................... F03D 9/02; F03D 3/02; F04D 13/08

[52] U.S. Cl. .......................................... 290/55; 290/44; 415/62; 416/171

[58] Field of Search ........................ 290/44, 55, 42, 43, 290/53, 54; 416/171; 415/62; 60/398

[56] References Cited

U.S. PATENT DOCUMENTS

| | | | |
|---|---|---|---|
| 1,181,988 | 5/1916 | Breitung | 290/44 |
| 3,373,821 | 3/1968 | Sare | 416/171 |
| 3,603,699 | 9/1971 | Brashear | 416/171 |
| 3,721,290 | 3/1973 | Butler, Jr. | 290/55 |
| 3,822,740 | 7/1974 | Hackett | 416/171 |

*Primary Examiner*—J. V. Truhe
*Assistant Examiner*—Shelley Wade

[57] ABSTRACT

The invention is an energy-saving means for providing turbulence as well as circulation to liquids in a controlled natural purification system for advanced waste water treatment and algae farming. The wind-powered impeller-mixers are used in the algae growing reactors of a controlled natural purification system. The invention consists of a vertical vane type windmill that turns an impeller blade to cause turbulence in waste water being treated. The impeller blade may be geared to operate from a horizontal position to a vertical position to provide circulation movement. A motor-generator hook-up is combined with windmill-impeller system so that generated energy may be stored for use in turning the impeller blade when there is no wind or not enough wind to operate the system. A clutch arrangement is used to disengage the impeller when the algae growing reactor is to be drained.

21 Claims, 2 Drawing Figures

WIND-POWERED IMPELLER-MIXER

BACKGROUND AND SUMMARY OF THE INVENTION

The invention relates to wastewater treatment systems and in particular to wastewater treatment systems in which conversion of organic wastes and light energy to glucose takes place. Specifically, the invention relates to a complex system in which wastewater and other associated discharges are treated anaerobically and aerobically in a tank complex system where waste organics are reduced to inorganic forms available for algal culture in the uniquely designed rapid growth tanks.

This invention is an improved component of a pending application of the present invention for a Controlled Natural Purification System for Advanced Wastewater Treatment and Protein Conversion and Recovery, Ser. No. 95,969, filed Nov. 20, 1979.

In the operation of controlled natural purification systems for advanced waste water treatment and algae farming, the process operates through a complex series of tank means. In the last stage of the system various configurations of tanks are used. This last stage is referred to as the A-6 tank stage, particularly as provided in the referenced copending patent application.

Another descriptive term for these A-6 tanks in the controlled natural purification system is algae growth reactors, as they are involved in the last stage of algae growth, particularly when part of a system used in algae growth farming.

In the last stage of the process, various means are used to provide controlled liquid mixing and quiescence. The wind-powered impeller-mixer of this invention is an improved means to obtain that mixing and is so constructed so that when the impeller-mixer is not needed it can be stopped, such as during periods of culture-liquid quiescence, decanting operations, drawdown and recovery of primary algal concentration, and any similar such operations.

Normally such impeller-mixing operations may be operated by energy means provided from an external source, such as an electrical current to operate an electrical motor to turn the impeller. This invention provides an improved means for energy conservation by utilizing wind power.

The wind-powered impeller-mixer is a wind-driven rotor which drives a submerged impeller on a vertical shaft.

Coupled with this basic structure is a solenoid-operated clutch to engage and disengage the impeller.

Also coupled with the basic structure is a motor-generator and battery storage system. A generator to produce electrical energy for battery storage when the wind is blowing and turning the impeller-mixer and the motor, operated from the battery system, to drive the impeller-mixer, if needed, when there is little wind or when the wind is not blowing. A standby electrical connection to a separate electrical source, for emergency use, may be used in case of long periods of little or no wind, or in case of insufficient battery current at any time.

When the impeller-mixer is not needed, such as during periods of culture-liquid quiescence, decanting, drawdown and recovery of primary algal concentration, the impeller-mixer may be declutched so the wind-powered system may continue to charge the battery system.

When the impeller-mixer is in use during moderate to high wind velocities, the battery charging system can also be operated by means of the excess of wind-power available over and above that required for opening the impeller-mixer.

The impeller-mixer enhances algal growth by controlling the mixing to achieve a maximum number of algal cells in an optimum exposure to light and dark in accordance with hourly, daily, and seasonally changing conditions of solar insolation.

The impeller-mixers are set to impart a radial vector thrust to the culture liquid in relation to the normal peripheral circulation in the algae growth reactors. This radial vector thrust to the culture liquid along the bottom of the algae growth reactor gives a uniform mixing throughout each of the nodes of the algae growth reactor where a plurality of the impeller-mixers are installed.

It is to be understood that, although this invention is for a wind-powered impeller-mixer to mix a culture liquid in an algae growth reactor, this impeller-mixer may be used for other mixing purposes and that all such impeller-mixing uses are within the scope and intent of this invention.

It is, therefore, an object of the invention to provide an impeller-mixer that is wind-powered for energy conservation.

It is another object of the invention to provide a wind-powered impeller-mixer for use in mixing culture liquids in algae growth reactors.

It is also an object of the invention to provide a wind-powered impeller-mixer that can be declutched when mixing is not required.

It is still another object of the invention to provide a wind-powered impeller-mixer that additionally generates power for battery storage for use when wind is insufficient to operate the impeller-mixer.

It is yet another object of the invention to provide a wind-powered impeller-mixer that additionally is operable from battery storage power when wind is insufficient to operate the impeller-mixer.

It is yet still another object of the invention to provide a wind-powered impeller-mixer wherein the motor-generator and battery storage system is carried on the wind rotor means.

Further objects and advantages of the invention will become more apparent in the light of the following description of the preferred embodiments.

DESCRIPTION OF THE PREFERRED EMBODIMENTS

Figure 1:
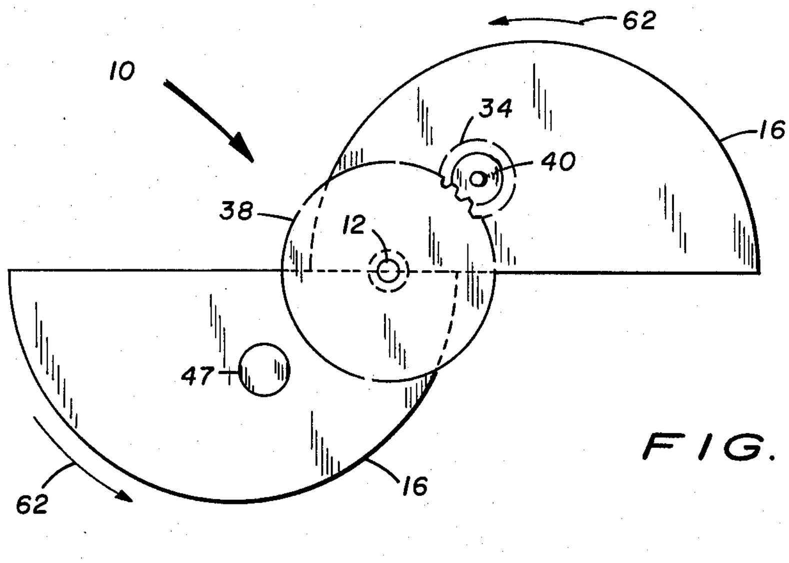
FIG. 1 is a plan view of a wind-powered impeller-mixer.

Referring to the drawings a wind-powered impeller-mixer is shown at 10. The wind-powered impeller-mixer 10 consists of: a fixed center mast 12 set in base means 14; at least two wind rotor vanes 16 affixed to a centrally located torque tube 18, said torque tube 18 rotatably centered around said fixed center mast 12; an upper cllutch plate means 20 rigidly affixed to the lower-most end of said central torque tube 18 and the exterior bottom surface of said wind rotor vanes 16 and rotatable around said fixed center mast 12; a solenoid 22 rigidly affixed to said fixed center mast 12 below said upper clutch plate means 20; an armature means 24, said armature means 25 being slidably mounted on said fixed center mast 12 below said solenoid 22; an impeller means 26 rigidly affixed to the lower end of an impeller carrier means 28, said impeller carrier means rotatably mounted around said fixed center mast 12 and supported on a carrier bearing 30 located on an uppermost surface of said armature means 24; said impeller carrier means 28 serving as a housing around said solenoid 22 and armature means 24 and having a lower clutch plate means 32 on the uppermost side of impeller carrier means 28.

Coupled with the wind-powered impeller-mix 10 is a motor generator means 34 affixed to the upper plate 36 of one of the wind rotor vanes 16. A gearing system of a large gear 38 rigidly affixed to the fixed center mast 12 and a small gear 40 affixed to the shaft 42 of the motor generator means 34 operate to rotate the shaft 42 as the wind rotor vanes 16 rotate about the fixed center mast 12.

Batteries 44 are affixed to the lower plates 46 of wind rotor vanes 16. Thus, current generated by the generator action of motor-generator means 34 can be stored in batteries 44 by direct wiring without the need for slip rings or any other special current collector distribution means. An overcharge regulator 47 protects the motor generator battery system. The overcharge regulator 47 is affixed to the upper plate 36 one of the wind rotor vanes 16.

Figure 2:
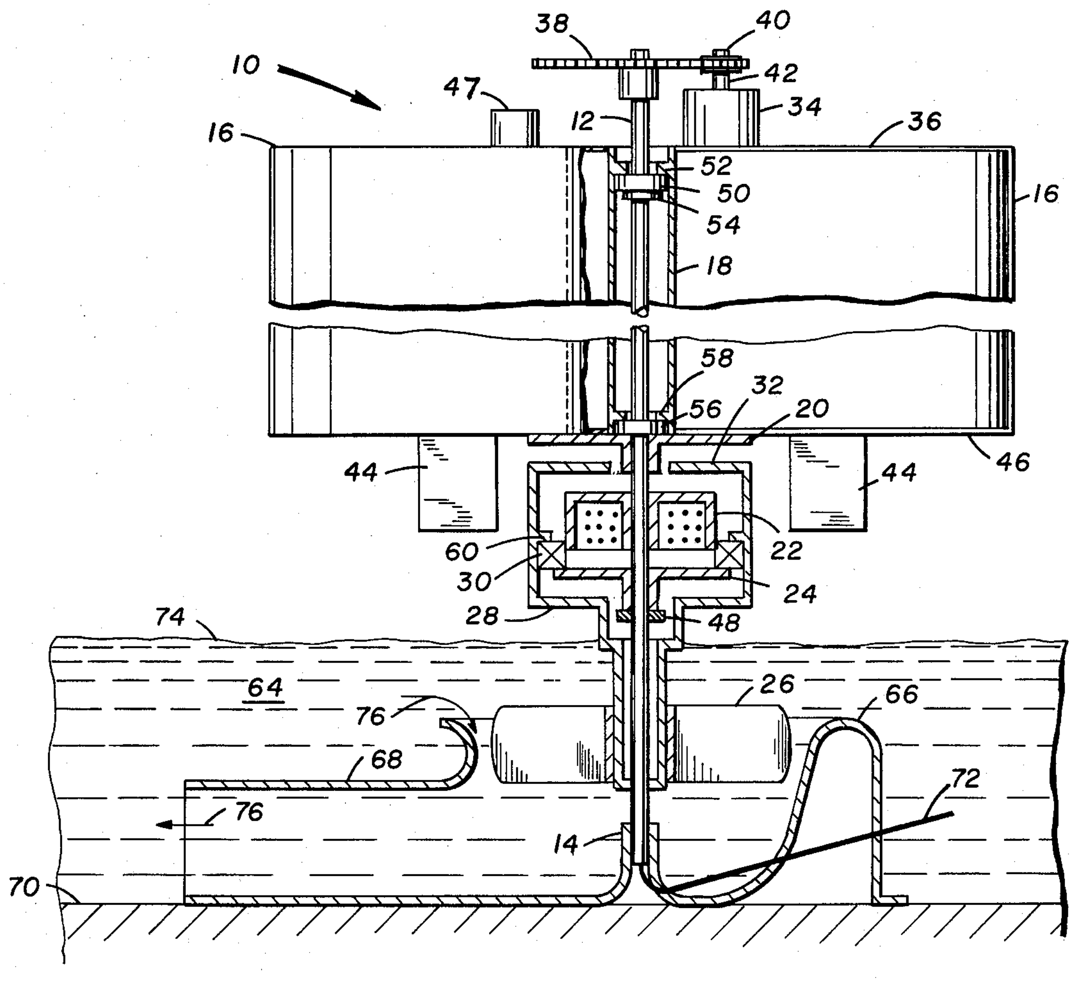
FIG. 2 is a partial cross sectional view of a wind-powered impeller-mixer.

When the impeller carrier means 28 is in the declutched position, as shown in FIG. 2, the armature means rests on an armature down stop 48 which is rigidly affixed to the fixed center mast 12.

The central torque tube 18 is movably centrally located around the fixed center mast 12 by the upper bearing 50 and a lower bearing 56. The wind rotor structure, composed of the plurality of wind rotor vanes 60 affixed to the central torque tube 18, rests upon and rotates on said upper bearing 50, through the internal collar 52 of torque tube 18 when the wind-powered impeller-mixer 10 is in the declutched position as shown in FIG. 2. The bearing 50 rests upon and is supported by a collar 54 rigidly affixed to the fixed center mast 12.

When the impeller carrier means 28 is engaged with the upper clutch plate means 20, as hereinafter described, there is an upward thrust force that is absorbed by the lower bearing 56 which bears against a lower internal collar 58 of torque tube 18. The upward thrust movement is limited to the distance moved by the armature means 24 to make contact engagement with the solenoid 22 when the solenoid 22 is energized.

When in the "clutch engaged mode" the rotor structure, composed of the plurality of wind rotor vanes 60 affixed to the central torque tube 18 rests upon the lower bearing 56 through the lower internal collar 58. In turn, the load of the aforementioned rotor structure, through the clutch engagement of upper clutch plate means 20 and lower clutch plate means 32, is transmitted to the carrier bearing 30 through internal collar means 60 rigidly affixed to the internal surface of impeller carrier means 28.

Each wind rotor vane 16 of the wind rotor structure is formed in a cup-like arc with the top and bottom ends of the arc-like surface covered or enclosed by an upper plate 36 and a lower plate 46 rigidly affixed to the edges of the cup-like arc. The vertical height may be any height as needed for power. As can be seen in FIGS. 1 and 2, the cup-like arcs partially artically overlap each other.

It is to be understood that where collar-like members 52, 54, 58, and 60 are said to be rigidly fixed, they may be integral with the component to which they are rigidly fixed, such integral structural means being within the scope and intent of this invention.

It is also to be noted and understood, that for assembly purposes, the central torque tube 18 and the impeller carrier means 28 may be structured in a plurality of parts or sections, such plurality of parts or sections for assembly purposes is within the scope and intent of this invention.

The impeller means 26 is shown with two blades in FIG. 2, it is to be understood that a plurality of blades is within the scope and intent of this invention.

It is also to be understood that within the scope and intent of the invention, the impeller means 26 may be separately mounted from the impeller carrier means 28 and geared thereto to permit a plurality of impeller positions from the horizontal to the vertical.

It is also to be understood that the wind rotor structure, described hereinbefore for the impeller-mixer operation, is also applicable to water wheels, for power purposes, used in the referenced copending application for a controlled natural purification system for advanced wastewater treatment and algae forming.

The direction of rotation of the wind rotor vanes 16 is indicated in FIG. 1 by arrow 62.

As the wind rotor vanes 16 rotate in the wind and rotate the impeller means 26, when clutch engaged, the liquid 64 is drawn downward by the shape and configuration of the blades of the impeller means 26 into a deflector means 66. A flow direction housing 68, which is part of the base means 14 and the deflector means 66, directs the flow of the liquid 64 in a predetermined direction across the floor 70 of the tank system in which the wind-powered impeller-mixer 10 is installed.

The combination of base 14, with the associated deflector means 66 and the flow direction housing 68 are suitably affixed to the floor 70 of the tank system, thus anchoring the wind-powered impeller-mixer 10 in place.

Wiring to the solenoid 22 in suitable waterproof conduit may be directed through the fixed center mast 12 as shown in FIG. 2.

For comparative purposes, the liquid 64 is shown at a level 74 in relation to the impeller means 26 and impeller carrier means 28. The operation of the wind-powered impeller mixer 10 is outlined below.

When the liquid 64 is to be redirected as part of the controlled natural purification process, the solenoid 22 is energized by a current through the wiring in conduit 72 from an external power source.

The solenoid 22 and the armature means 24 are cylindrical-like in configuration and surround the fixed center mast 12. The solenoid 22 being affixed to the fixed center mast 12 and the armature means 24 being slidably located below the solenoid 22 on the fixed center mast 12.

The energizing of solenoid 22 draws up the armature means 24 to the solenoid 22 on the fixed center mast 12. As the armature means 24 moves upward the carrier bearing 30 also moves upward. The rising carrier bearing 30 raises the internal collar means 60 and with it the impeller carrier means 28.

As the impeller carrier means 28 moves upward, the lower clutch plate means 32, which is part of the impeller carrier means 28 assembly, engages the upper clutch plate means 20. It is to be understood that the clutch engagement of the upper and lower clutch plate means 20 and 28 respectively may be a friction-type clutch engagement, a positive contact-type engagement, or any other suitable clutch engagement known in the art and fitted to the structure of this invention.

As the wind blows it provides a pressure against the interior cup-like side of the wind rotor 16 which is directly exposed to the wind. The wind, thereby, forces the plurality of the wind rotor vanes 16 to rotate in the direction 62 about the fixed center mast 12. This rotation of the wind rotor vanes 16 is thus the total assembly of the wind rotor system which is composed of the wind rotor vanes 16, the central torque tube 18 and upper clutch plate means 20.

As the upper and lower clutch plate means 20 and 32 are engaged, as hereinbefore described, the rotation is imparted through the impeller carrier means 28 to the impeller means 26. As described hereinbefore, as the impeller means 26 rotates the liquid 64 is drawn downward through the deflector means 66 and redirected out through the flow direction housing 68 across the floor 70 of the tank system. The direction of flow of liquid 64 is shown by arrows 76.

As the wind-powered impeller-means 10 operates, the rotating wind rotor vanes 16 also generate a current through the action of the motor generator 34 as described hereinafter.

The motor generator 34, affixed to the uppermost side of the upperplate 36 of one of the wind rotor vanes 16 transcribes a circle around the fixed center mast 12. As this circular motion of the motor generator 34 continues, the small gear 40 on the shaft 42 of the motor generator 34 is turned and rotated by its tooth engagement with the fixed large gear 38 which is fixed to the fixed center mast 12. The small gear 40 more or less rolls around the large gear 38 in its tooth engagement as it rotates in the aforementioned circle. In this manner the motor generator set 34 acts as a generator and generates a current.

The aforementioned generated current is transmitted to the plurality of storage batteries 44 by electrical wiring, not shown, for storage for future use. The storage batteries are supported on the rotating wind rotor vanes 16 from the lower plate 46 of the wind rotor vanes 16. An overcharge regulator 47, suitably connected to the battery charging system, protects the storage batteries form damage.

When the liquid 64 in the tank is to be decanted or otherwise processed as part of the controlled natural purification system as hereinbefore mentioned, the impeller action must be stopped. The solenoid 22 is deenergized and the armature means 24 drops away from the solenoid by gravity action. As the armature means 24 drops down, the impeller carrier means 28 also drops down by gravity action, thus disengaging the clutch action of the upper and lower clutch means 20 and 32 respectively. As the clutch disengagement takes place the impeller 26 stops rotating along with the disengaged impeller carrier means 28.

Even though the clutch action has been disengaged, the aforementioned current generating continues as the wind continues to rotate the wind rotor vanes 16.

When ever the wind is very light or nil the rotation can be continued in order to rotate the impeller, when connected through clutch engagement, by use of the stored electrical energy in the batteries 44 to operate the motor of the motor generator set 34. For emergency, such as in a prolonged light wind or no wind situation, an external power source may be used to operate the motor of the motor generator set 34 if the battery 44 power is exhausted.

It is to be understood that the materials for the wind rotor vanes 16 may be light weight metal, plastics, or any other suitable material. Other parts may be metal, plastics, or suitable materials, depending upon the characteristics required for the element or component involved. The light weight materials are suggested as most desirable for the rotating parts in order to obtain the best use of the wind power available. However, it is to be understood that any suitable material is within the scope and intent of the invention.

As can be readily understood from the foregoing description of the invention, the present structure can be configured in different modes to provide the ability to operate an impeller-mixer by wind-power.

It should be noted that various applications of the wind motor and clutching device, motor-generator and battery storage complex can be made to power other devices, such as the horizontal-axis waterwheels.

It should be further noted that the wind impeller-mixers facilitate the air to water transfer of atmospheric oxygen and carbon dioxide by drawing air down and diffusing it in the water.

Accordingly, modifications and variations to which the invention is susceptible may be practiced without departing from the scope and intent of the appended claims.

What is claimed is:

1. A wind-powered impeller-mixer, comprising:
- a center mast member;
- a wind rotor structure, said wind rotor structure being rotatable located around said center mast member;
- a solenoid means, said solenoid means being affixed to said center mast member and having an armature means, said armature means being slidably located on said center mast member;
- an impeller structure, said impeller structure being rotatably located around said solenoid means and below said wind rotor structure; and
- a clutch means, said clutch means being located between said wind rotor structure and said impeller structure, separate parts of said clutch means being affixed to said wind rotor structure and to said impeller structure.

2. The wind-powered impeller-mixer as recited in claim 1, and additionally, a base means, said center mast member being rigidly affixed to said base means for support, said base means being suitably affixed to the surface upon which it rests.

3. The wind-powered impeller-mixer as recited in claim 1, wherein said wind rotor structure consists of a central torque member and at least two wind rotor vanes affixed to the exterior surface of said central torque member.

4. The wind-powered impeller-mixer as recited in claim 3, wherein said central torque member is a hollow cylindrical tube-like structure, said central torque member being centrally located and rotatable around said center mast member, said wind rotor vanes each being formed in a cup-like arc and having upper and lower plate members affixed to the arc-like edges of said cup-like arc, said cup-like arcs affixed to exterior surface of said central torque member partially overlap each other.

5. The wind-powered impeller-mixer as recited in claim 1, wherein said solenoid means is cylindrical-like in configuration and centrally located on and rigidly affixed to said center mast member, said armature means being cylindrical in configuration and located below said solenoid means.

6. The wind-powered impeller-mixer as recited in claim 2, wherein said impeller structure consists of an impeller carrier means and an impeller means, said impeller means being affixed to said impeller carrier means.

7. The wind-powered impeller-mixer as recited in claim 6, wherein said impeller carrier means is cylindrical-like in configuration and hollow, said cylindrical-like configuration being so shaped so as to surround and enclose said solenoid means and said armature means, thereafter said impeller carrier means being extended to provide a carrier support for said impeller means to be affixed thereto at the distal end thereof, said impeller means consisting of at least two blades, said blades being configured so as to draw a liquid downward and therethrough when operated by the wind-powered wind rotor structure.

8. The wind-powered impeller-mixer as recited in claim 1, wherein said clutch means consists of an upper clutch plate means and a lower clutch plate means, said upper clutch plate means being affixed to the lower external surface of said wind rotor structure, and said lower clutch plate means being affixed to the upper external edge of said impeller structure.

9. The wind-powered impeller-mixer as recited in claim 8, wherein said clutch means is a friction-type clutch for engagement.

10. The wind-powered impeller-mixer as recited in claim 8, wherein said clutch means is a positive contact-type clutch for engagement.

11. The wind-powered impeller-mixer as recited in claim 4, and additionally a first and second bearing means, said first and second bearing means serving to centrally locate said central torque member around said center mast member, said first bearing means further serving to support said wind rotor structure when said clutch means is disengaged, said second bearing member further serving to take vertical thrust when said clutch means is engaged.

12. The wind-powered impeller-mixer as recited in claim 11 wherein said first bearing means is supported by a collar means on said center mast member and said central torque member transmits load to said first bearing means by an internal collar means in said central torque member.

13. The wind-powered impeller-mixer as recited in claim 11 wherein said second bearing member transmits vertical thrust through an internal collar means in said central torque member.

14. The wind-powered impeller-mixer as recited in claim 7 wherein said armature means is supported during clutch means disengagement by a stop means, said stop means being rigidly affixed to said center mast member.

15. The wind-powered impeller-mixer as recited in claim 14, and additionally a third bearing means, said third bearing means being supported by said armature means, said third bearing means serving to centrally locate said impeller carrier means around said solenoid means and further to support said impeller carrier means.

16. The wind-powered impeller-mixer as recited in claim 15, and additionally, an internal collar in said impeller carrier means, said internal collar transmitting load of said impeller carrier means to said third bearing means and further, said internal collar means serving as means to raise impeller carrier means to facilitate clutch engagement when said solenoid is energized to raise said armature means, said armature means thereby raising said third bearing means and thereby raising said impeller means through said internal collar means in said impeller means.

17. The wind-powered impeller-mixer as recited in claim 7 and additionally a deflector means and a flow direction housing, said deflector means and said flow direction housing being integral with said base means, said deflector means serving to funnel liquid to said impeller means being drawn downward by said impeller blades when operating, said liquid thereby be discharged into said flow direction housing for directional flow.

18. The wind-powered impeller-mixer as recited in claim 4 and additionally, a motor-generator means, said motor-generator means located on and affixed to the topmost surface of one of said wind rotor vanes, said motor-generator means having a shaft therein.

19. The wind-powered impeller-mixer as recited in claim 18 and additionally a first gear and a second gear, said first gear being rigidly fixed to the top of said center mast member, said second gear being affixed to said shaft of said motor-generator and meshing with said first gear.

20. The wind-powered impeller-mixer as recited in claim 19 and additionally a storage battery means, said storage battery means being affixed to and supported by the lowermost surfaces of said wind rotor vanes, said batteries electrically connected to said motor-generator means.

21. A wind-powered impeller-mixer as recited in claim 1, and additionally a device mechanically coupled to said rotatably located impeller structure and arranged to be powered thereby.

* * * * *